Aug. 23, 1966 H. PETH 3,268,657

SYNCHRONIZING ARRANGEMENT FOR COLOR TELEVISION APPARATUS

Filed Aug. 26, 1963 2 Sheets-Sheet 1

Jnventor:
Horst Peth
by Michael J. Striker
Attorney

Jnventor:
Horst Peth
by Michael S. Striker
Attorney

United States Patent Office 3,268,657
Patented August 23, 1966

3,268,657

SYNCHRONIZING ARRANGEMENT FOR COLOR TELEVISION APPARATUS

Horst Peth, Darmstadt, Germany, assignor to Fernseh G.m.b.H., Darmstadt, Germany Filed Aug. 26, 1963, Ser. No. 304,323
Claims priority, application Germany, Aug. 29, 1962, F 37,688
12 Claims. (Cl. 178—5.4)

The present invention relates to synchronizing arrangements for color television apparatus and particularly for color television receivers and color test-gear.

In accordance with conventional television practice the color synchronizing signal is transmitted as color synchronizing component of a composite color television signal or of a color video signal. Under proper operating conditions this color synchronizing component is used to synchronize color television apparatus. When this color synchronizing component is missing for any reason the color synchronization of the color television apparatus is disturbed. This occurs especially when the color synchronizing component is lost for a brief time during change-over from one color video signal to another, or when a monochrome video signal is mixed-in during the course of a color programme, as a caption, for example. The color synchronizing component may also fail to appear if, for example, the output of a crossbar switch is inadventently connected to an empty input channel.

It is a broad object of the present invention to provide a method and a synchronizing arrangement for color television apparatus maintaining proper synchronization if the color synchronizing signal fails to occur.

It is a further object of the present invention to provide a novel synchronizing arrangement for color television apparatus ensuring automatically proper color synchronization if the color synchronizing signal should fail for any reason.

According to the present invention there are provided means being sensitive to the presence of a main color synchronizing signal. As long as this main color synchronizing signal is present said means are in a first operating condition and said main color synchronizing signal is applied to a color television apparatus to be synchronized. When this main color synchronizing signal is absent said means are in a second operation condition and an auxiliary color synchronizing signal is applied to said television apparatus. It will be seen that by the use of the present invention the color television apparatus is synchronized at all times either by the main color synchronizing signal or by the auxiliary color synchronizing signal.

The phasing of the main color synchronizing signal must be synchronized to the auxiliary color synchronizing signal. In many cases it is sufficient for this adjustment to be effected manually. In some cases, however, it is advantageous to effect the necessary adjustments automatically, the phasing of the color synchronizing signals being compared either with one another, or individually with that of a reference signal, and the control voltages derived by this comparison being used to effect an appropriate adjustment of a phase shifting device such as to reduce, and preferably substantially to eliminate, any phase difference which may appear.

The color synchronizing signal is usually transmitted as a component of a color video signal, which is produced in an appropriate NTSC color coder. A signal of the color sub-carrier frequency is applied to each such NTSC coder and the control voltage derived by phase comparison of the color synchronizing signals may therefore be used to adjust the phase of the sub-carrier signal applied to one of the NTSC coders so as to produce phase synchronization of the synchronizing components.

In a preferred embodiment of apparatus according to the invention there are employed a demodulator and a gate. When the main color synchronizing signal is present there results a first operating condition in which this main color synchronizing signal is applied on the one hand to the color television apparatus to be synchronized and on the other hand to the demodulator. The demodulator yields a train of pulses corresponding to the main color synchronizing signal (burst). The auxiliary color synchronizing signal is applied to the gate being blocked in this first condition of operation by the train of pulses of the demodulator. If, for any reason, the main color synchronizing signal should fail, then a second condition of operation results in which the train of pulses is no longer produced, so that the gate is no longer blocked and the auxiliary color synchronizing signal is allowed to pass. During the second condition of operation the color television apparatus is thus synchronized by the auxiliary color synchronizing signal.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

In both these drawings corresponding elements are designated by the same reference numerals.

Figure 1:
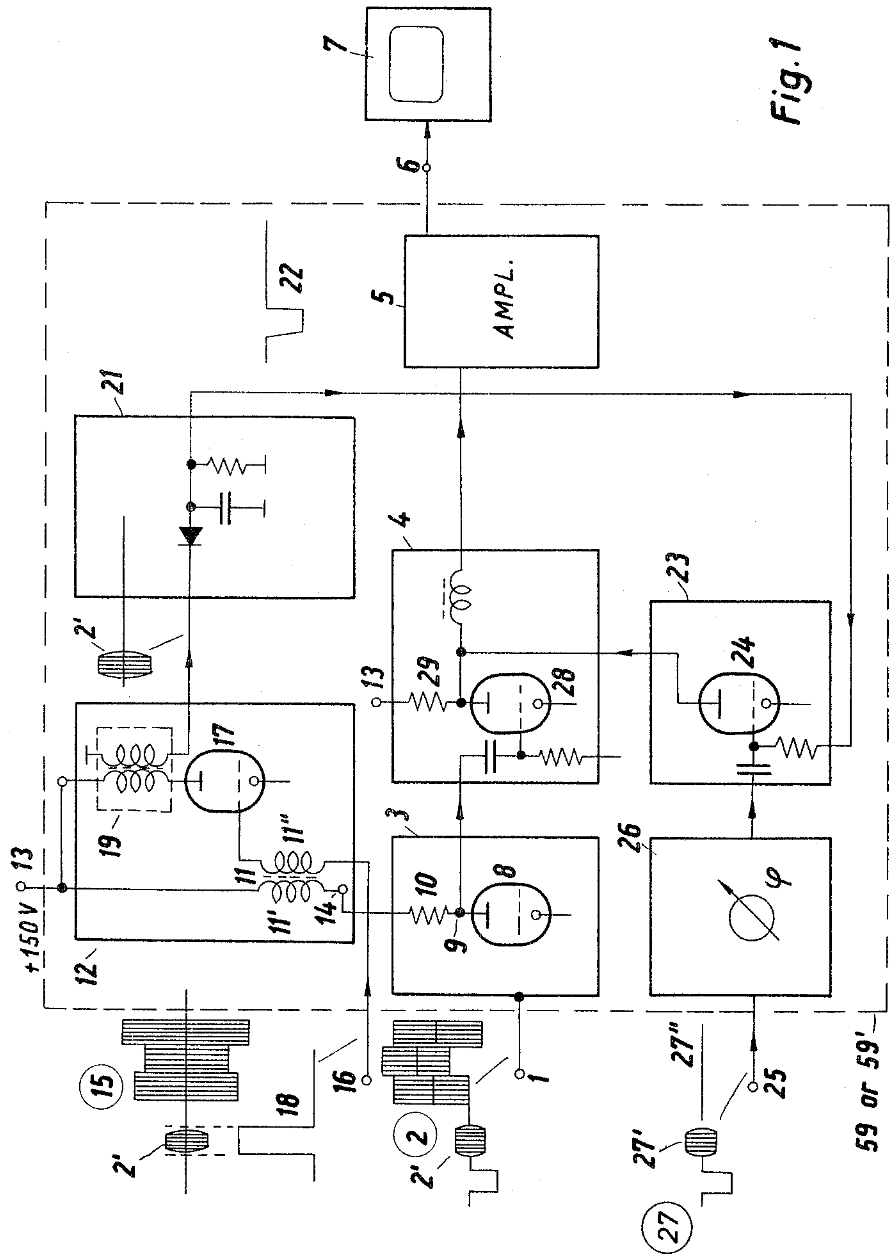
FIGURE 1 shows a circuit arrangement for automatically supplying an auxiliary color synchronizing signal whenever the initial (main) color synchronizing signal may fail.

To terminal 1 of the circuit arrangement shown in FIGURE 1 there is applied a color video signal illustrated by waveform 2 and containing a color synchronizing component 2′ (main color synchronizing component). This signal may, for example, be a composite color television signal, or a color video signal. The signal received at terminal 1 is fed by way of a preamplifier 3, an adding stage 4, an output stage 5 and an output terminal 6 to a color television receiver 7, on the screen of which the corresponding picture is displayed. It is assumed that the main color synchronizing component 2′ included in the color video signal 2 may fail from time to time. When this main color synchronizing component is present, however, the color television receiver 7 is synchronized in the usual manner.

The preamplifier 3 includes an amplifier valve 8, the anode of which is returned to the +150 v. supply received at terminal 13 by way of a load resistor 10 and by way of a winding 11′ of a transformer 11 forming part of a separator stage 12. At point 14 in the circuit, that is, at the junction of resistor 10 and winding 11′ there arises the signal illustrated by waveform 15. Rectangular pulses, illustrated by waveform 18, which arise during the incidence of the main color synchronizing components 2′ are received at a terminal 16, whence they are applied by way of a winding 11″ of transformer 11 to the grid of a valve 17, which is driven positive by these pulses so that the valve will then become conductive. There thus arise at the anode of valve 17 the main color synchronizing components 2′, which are fed to a band-pass filter represented by transformer 19, whence they are applied to a demodulator stage 21. The demodulator 21 yields video frequency pulses 22 of approximately rectangular form which are applied to a gating circuit 23 where they cut off valve 24.

Signals received at a terminal 25 are applied by way of a phase-shifting device 26 to the grid of valve 24. The signal received at terminal 25 is an auxiliary color video signal 27 including the auxiliary color synchronizing component 27'. The remainder of signal 27 may have an amplitude corresponding to the black level 27''.

When the main color synchronizing component 2' is present in color video signal 2 and the pulse 22 is therefore developed, valve 24 is blocked to the color synchronizing pulses 27'. If, however, the main color synchronizing component 2' is missing for any reason, then pulse 22 is not produced and the auxiliary color synchronizing component 27' is applied by way of gating valve 24 to adding stage 4.

Adding stage 4 includes an amplifying valve 28, to the grid of which is applied the color video signal received from preamplifier 3 and of which the anode load 29 is shared by gating valve 24. When valve 24 is operative to amplify the auxiliary color synchronizing components 27' applied to its grid, these components will thus appear across the common anode load resistor 29 of valves 24 and 28, so that they are added to color video signal 2. In this manner a color video signal 2 containing a color synchronizing component is fed by way of amplifier 5 to output terminal 6 even when its original color synchronizing component 2' fails. The color synchronization of television receiver 7 is thus maintained at all times and disturbance of color synchronization is avoided.

The phase-shifting device 26 is adjusted in such a manner, for example by hand, that there exists no measurable difference in phase at the output of final amplifier 5 between the color synchronizing components 2' and 27'.

Figure 2:
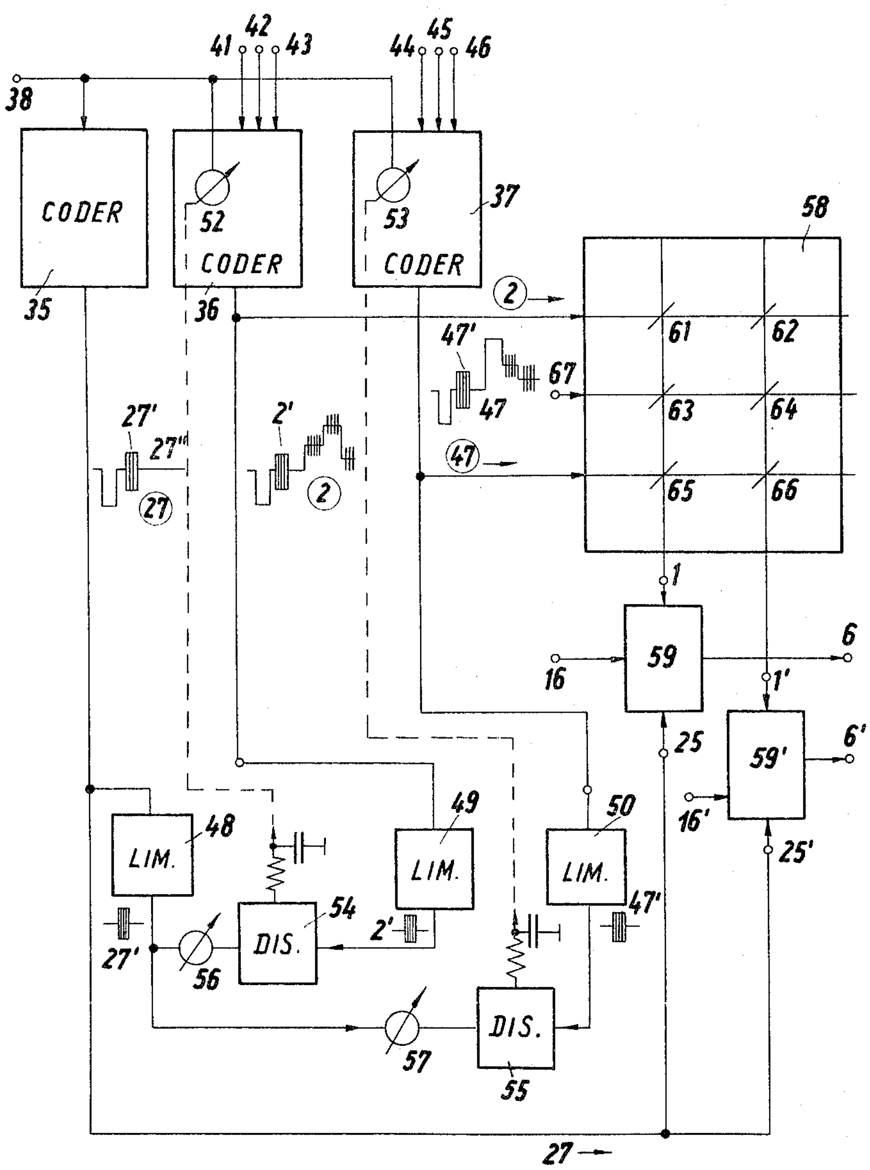
FIGURE 2 shows a circuit arrangement for automatically removing any difference in phase between color synchronizing signals such as are applied to the circuit arrangement shown in FIGURE 1.

FIGURE 2 shows a circuit arrangement by means of which phase synchronization between the color synchronizing components 2' and 27' may be effected automatically. Here a color sub-carrier signal received at a terminal 38 is applied to three NTSC color coders 35, 36, 37 of which the latter two also receive chrominance signals corresponding to the colors red, blue and green by way of respective sets of terminals 41, 42, 43 and 44, 45, 46, to which individual television scanners are connected. In each of the NTSC coders 35, 36 and 37 there is produced a standard NTSC color video signal. These signals are illustrated at 27, 2 and 47 respectively. In order to correct automatically any difference in phase between the color synchronizing components 27', 2' and 47' included in the color video signals 27, 2 and 47, the color synchronizing components are separated from the video signals in respective separator stages 48, 49 and 50 and the synchronizing component 27' derived from the output of coder 35 is compared with the component 2' derived from coder 36 in a discriminator 54 to develop a control signal which is used to effect any necessary adjustment of a phase-shifting device 52 in coder 36, while synchronizing components 27' and 47' are compared in another discriminator 55 to develop a control signal which is applied to control as necessary a phase shifting device 53 in coder 37. Additional phase-shifting elements 56 and 57 are connected in the leads by which synchronizing component 27' is applied to discriminator 54 and 55 respectively in order to effect any necessary trimming of the phase relations in the system.

The color video signals 2 and 47 may be applied either directly or, as illustrated, by way of a cross-bar switch 58 to circuit arrangements 59 and 59' respectively. These circuit arrangements may each comprise the whole of the apparatus enclosed within the broken line labelled 59 or 59' in FIGURE 1. The input and output terminals of these circuit arrangements are denoted by the same reference numerals as are used in connexion with FIGURE 1, those of unit 59' being differenced by the addition of the prime. References 61, 62, 63, 64, 65 and 66 in crossbar switch 58 denote the relays by which connexion is made between any of the input bus-bars and any of the output bus-bars. A further color video signal in addition to signals 2 and 47 may be applied to input terminal 67 of crossbar switch 58 and selected for application to unit 59 or 59' by actuation of relay 63 or 64 respectively.

The color video signal 27 from coder 35 is applied to input terminals 25, 25' of units 59, 59' in which it is used to replace the color synchronizing component of video signal 2 or 27 whenever this fails. To terminals 16, 16' of units 59, 59' there are applied gating pulses 18 as described with reference to FIGURE 1.

The crossbar switch 58 is, for the sake of simplicity in illustration, shown as having only three inputs and two outputs. The crossbar switches used in practive in television studios in general have substantially more inputs. It may therefore arise that to one or more of these inputs no signal is applied, and that one of the outputs is inadvertently connected to such an input. In this case the color synchronization of apparatus connected to the output of the crossbar switch would normally be disturbed. Owing to the use of devices 59, 59' in accordance with the present invention, however, such a loss of color synchronization is prevented as previously described.

The invention is particularly applicable in the field of television studio technique, where television monitors may be connected directly to the output terminals 6, 6' of units 59, 59'. It is also possible, however, for these terminals to be connected to a television transmitter by way of a selector switch and for the selected signal to be transmitted to a domestic receiver by way of a broadcast transmitter. The invention may also be used in the field of industrial television, and in fact in any application of color television.

While the invention has been illustrated and described as embodied in a synchronizing arrangement for color television apparatus it is not intended to be limited to the details shown, since various modifications and structural changes may be made without departing in any way from the spirit of the present invention.

What is claimed as new and desired to be secured by Letters Patent is:

1. Synchronizing arrangmeent for color television apparatus being synchronized by a main color synchronizing signal comprising, in combination, signal discriminator means having two operating conditions according to the presence and to the absence respectively of a signal applied to its input lead and generating a control signal during the absence of said signal; connection means applying said main color synchronizing signal to said input lead of said signal discriminator means; a gate having two input leads and one output lead connecting conductively its first input lead to its output lead whenever a signal arrives at its second input lead; connection means applying said control signal to said second input lead of said gate; connection means applying an auxiliary color synchronizing signal to said first input lead of said gate; and connection means connecting the output lead of said gate to said color television apparatus.

2. Synchronizing arrangement according to claim 1 comprising a phase shifting device for adjusting the relative phases of said main color synchronizing signal and said auxiliary color synchronizing signal.

3. Synchronizing arrangement according to claim 1 comprising a phase shifting device being controlled by a control voltage; and means for comparing the phases of said main color synchronizing signal and said auxiliary color synchronizing signal and for deriving as a result of this comparison said control voltage in order to reduce the phase difference of said main color synchronizing signal and said auxiliary color synchronizing signal.

4. Synchronizing arrangement for color television apparatus being synchronized by a main color synchronizing component of a color television signal comprising, in combination, an adding stage adding two signals applied to its first and second input leads respectively; connection means applying said color television signal via said first input lead and via the output lead of said adding stage to said television apparatus being synchronized; signal discriminator means having two operating conditions according to the presence and to the absence respectively of a signal applied to its input lead and generating a control signal during the absence of said signal; a first gate having two input leads and one output lead connecting conductively its first input lead to its output lead whenever a signal arrives at its second input lead; connection means applying said color television signal to said first input lead of said first gate; connection means applying rectangular pulses arising during the incidence of said main color synchronizing component to said second input lead of said first gate; connection means connecting said output lead of said first gate to said input lead of said signal discriminator means; a second gate having two input leads and one output lead connecting conductively its first input lead to its output lead whenever a signal arrives at its second input lead; connection means applying said control signal to said second input lead of said second gate; connection means applying an auxiliary color synchronizing component to said first input lead of said second gate; and connection means connecting the output lead of said second gate to said second input lead of said adding stage.

5. Synchronizing arrangement according to claim 4 comprising a phase shifting device; connection means applying said auxiliary color synchronizing component via said phase shifting device to said first input lead of said second gate.

6. Synchronizing arrangmeent according to claim 4 comprising a phase shifting device shifting the phase of a signal applied to its first input lead, the phase-shift depending upon a control voltage applied to its second input lead; a phase discriminator having two input leads and generating a control voltage depending upon the phase difference of signals applied to its two input leads respectively; connection means applying said auxiliary color synchronizing component via said phase shifting device to said first input lead of said second gate; connection means applying said means color synchronizing component and said auxiliary color synchronizing component to said first and second input leads respectively of said phase discriminator; and connection means applying said control voltage of said phase discriminator to said second input lead of said phase shifting device.

7. Synchronizing arrangement according to claim 4 comprising a phase shifting device shifting the phase of a signal applied to its first input lead, the phase-shift depending upon a control voltage applied to its second input lead; a phase discriminator having two input leads and generating a control voltage depending upon the phase difference of signals applied to its two input leads respectively; connection means applying said main color synchronizing component via said phase shifting device to said apparatus being synchronized; connection means applying said main color synchronizing component and said auxiliary color synchronizing components to said first and second input leads respectively of said phase discriminator; and connection means applying said control voltage of said phase discriminator to said second input lead of said phase shifting device.

8. Synchronizing arrangement according to claim 4 comprising a first and a second phase shifting device shifting the phase of signals applied to their first input leads respectively, the phase-shifts depending upon control voltages applied to their second input leads respectively; a first and a second phase discriminator having two input leads each and generating a control voltage each depending upon the phase difference of signals applied to their two input leads respectively; connection means applying said auxiliary color synchronizing component via said first lead of said first phase shifting device to said first input lead of said second gate; connection means applying said color television signal via said first lead of said second phase shifting device to said apparatus being synchronized; connection means applying said mean color synchronizing component and a reference synchronizing signal to said first and second input leads respectively of said first phase discriminator; connection means applying said main color synchronizing component and said reference synchronizing signal to said first and second input leads respectively of said second phase discriminator; connection means applying said control voltages of said first and second phase discriminator respectively to said second leads of said first and second phase shifting devices respectively.

9. Synchronizing arrangement according to claim 4 comprising a NTSC-color coder producing said color television signal; a generator generating color sub-carrier frequency; a phase shifting device shifting the phase of a signal applied to its first input lead, the phase-shift depending upon a control voltage applied to its second input lead; connection means applying said sub-carrier frequency via said first input lead of said phase shifting device to said NTSC-color coder; a phase discriminator having two input leads and generating a control voltage depending upon the phase difference of signals applied to its two input leads respectively; connection means applying said main color synchronizing component and said auxiliary color synchronizing component to said two input leads respectively of said phase discriminator; and connection means applying said control voltage to said second input lead of said phase shifting device.

10. Signal discriminator means according to claim 4 comprising a demodulator stage demodulating an applied main color synchronizing component and yielding video frequency pulses of approximately rectangular form; connection means applying said video frequency pulses as said control to said second input lead of said second gate.

11. Signal discriminator means according to claim 10 comprising a band-pass filter of which the pass-band comprehends the color sub-carrier frequency and being connected in the signal path by which said main color synchronizing component is applied to said demodulator stage.

12. Method for synchronizing a color television apparatus by a main color synchronizing signal comprising the steps of generating a control signal characterizing the absence of said main color synchronizing signal; controlling a gate by said control signal and opening said gate during the absence of said main color synchronizing signal; applying an auxiliary color synchronizing signal via said gate to said color television apparatus and synchronizing said color television apparatus by said auxiliary color synchronizing signal during the absence of said main color synchronizing signal.

No references cited.

DAVID G. REDINBAUGH, *Primary Examiner.*

J. A. O'BRIEN, *Assistant Examiner.*